United States Patent [19]

Genovese

[11] 4,451,016
[45] May 29, 1984

[54] AUXILIARY FLOTATION SYSTEM

[75] Inventor: David E. Genovese, Peninsula, Ohio

[73] Assignee: The B. F. Goodrich Company, New York, N.Y.

[21] Appl. No.: 366,504

[22] Filed: Apr. 8, 1982

[51] Int. Cl.³ .............................................. B64C 25/56
[52] U.S. Cl. ................................................... 244/107
[58] Field of Search .................. 244/100 R, 105, 107, 244/139; 114/49, 53, 54, 360; 441/39

[56] References Cited

U.S. PATENT DOCUMENTS

| 605,231 | 6/1898 | Matignon | 114/54 |
|---|---|---|---|
| 1,796,595 | 3/1931 | Dunbar | 114/54 |
| 1,833,646 | 11/1931 | Hathorn | 244/107 |
| 1,888,418 | 11/1932 | Adams | 244/107 |
| 2,508,800 | 5/1950 | Rinne | 114/54 |
| 2,892,434 | 6/1959 | Ralleo et al. | 114/54 |
| 3,507,466 | 4/1970 | La Fleur | 244/105 |
| 4,108,402 | 8/1978 | Bowen | 244/139 |

FOREIGN PATENT DOCUMENTS 2229606  1/1975  France .................................. 114/54

Primary Examiner—Galen L. Barefoot
Attorney, Agent, or Firm—Harry F. Pepper, Jr.; Michael J. Colitz, Jr.

[57] ABSTRACT

Inflatable collars (32,34) are positioned on each side of a downed aircraft (10) and the collars (32,34) are connected by belly bands (80,100) to support the ends (18,20) of the aircraft (10). The bands (80,100) are positioned by positioning straps (90,90') which are attached to the aircraft (10) prior to inflation. The collars (32,34) are also attached to the aircraft (10) at intermediate locations (24,26). The collars (32,34) are divided into separate chambers (44,48,52,54,56,44',48',52',54',56') so that after inflation the different chambers of the collars (32,34) support the different parts (18,20,22) of the aircraft (10).

5 Claims, 5 Drawing Figures

AUXILIARY FLOTATION SYSTEM

BACKGROUND OF THE INVENTION

This invention relates to a system for supporting a downed aircraft such as a helicopter during the salvage operation. Helicopters are designed for landing on the water and flotation is provided by sponsons supplemented by onboard float bags to increase the stability of the aircraft on the water. In cases where the aircraft is damaged or the seas are rough, the sponsons and float bags may not be adequate to support the aircraft and as a result a number of aircraft have been lost.

SUMMARY OF THE INVENTION

According to this invention, a system is provided including inflatable collars and flexible supporting members which can be packed in a small space and then air-dropped at the crash sight for positioning and attachment to the aircraft by divers or swimmers. The inflatable collars may then be inflated by compressed air or other gas supplied by reservoirs attached to the collars. When inflated, the inflatable collars support the aircraft and provide a large righting moment to keep the aircraft in an upright position. Even if the aircraft has capsized, the system is adaptable for attachment to the aircraft and due to the high buoyancy produced will support the weight of the aircraft in the inverted position.

In acccordance with one aspect of the invention an auxiliary flotation system for aircraft downed at sea is provided comprising a first inflatable collar for positioning on the left side of the aircraft, a second inflatable collar for positioning on the right side of the aircraft, supporting means for connecting said first inflatable collar and said second inflatable collar to the aircraft, said supporting means including strap means extending between one end of said first inflatable collar and a corresponding end of said second inflatable collar, positioning means fastened to said strap means and having means for connection to a first end portion of the aircraft for holding said strap means in a position for supporting a predetermined part of the aircraft upon inflation of said first inflatable collar and said second inflatable collar, and means for inflating said first inflatable collar and said second inflatable collar after said positioning means is attached to the aircraft.

PRESENTLY PREFERRED EMBODIMENT

Figure 1:
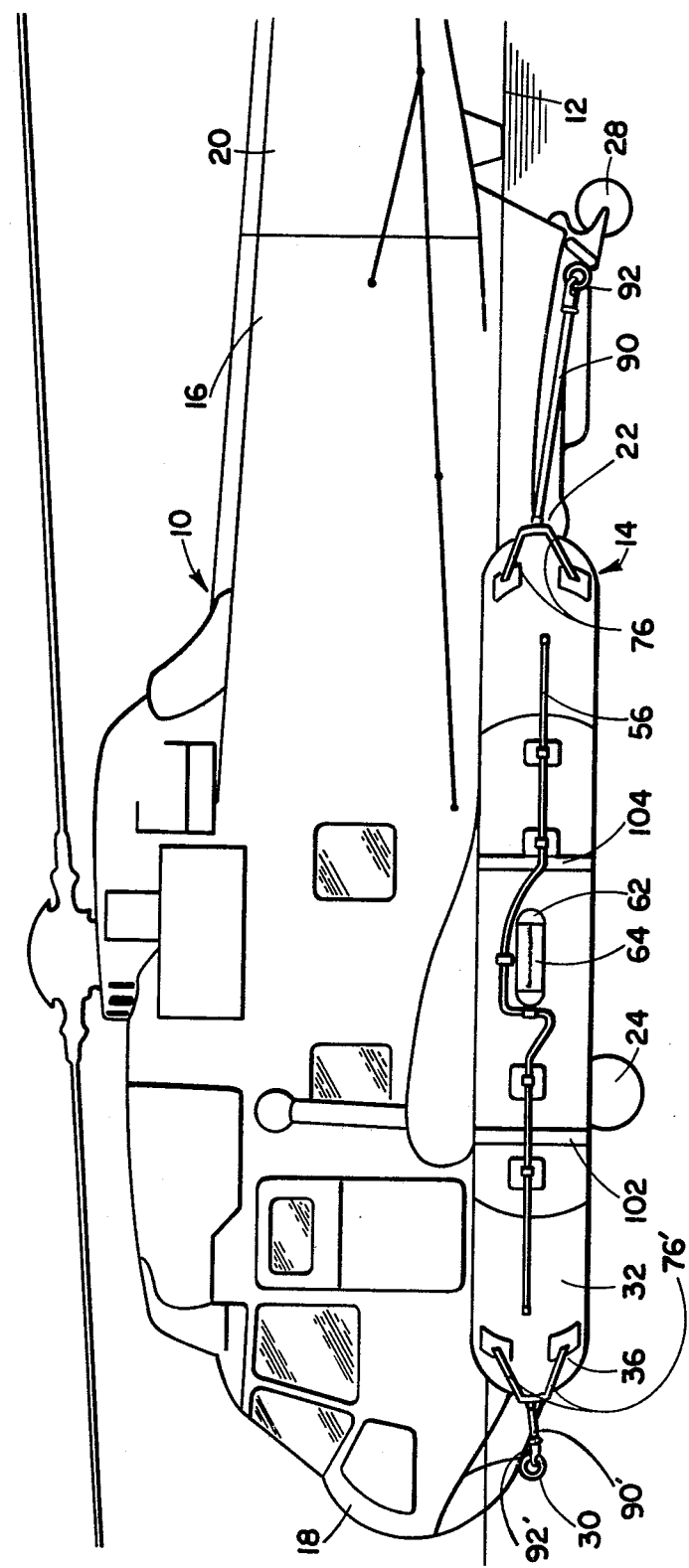
FIG. 1 is a side elevation of a helicopter downed in the water and supported by the auxiliary flotation system embodying this invention.
Figure 2:
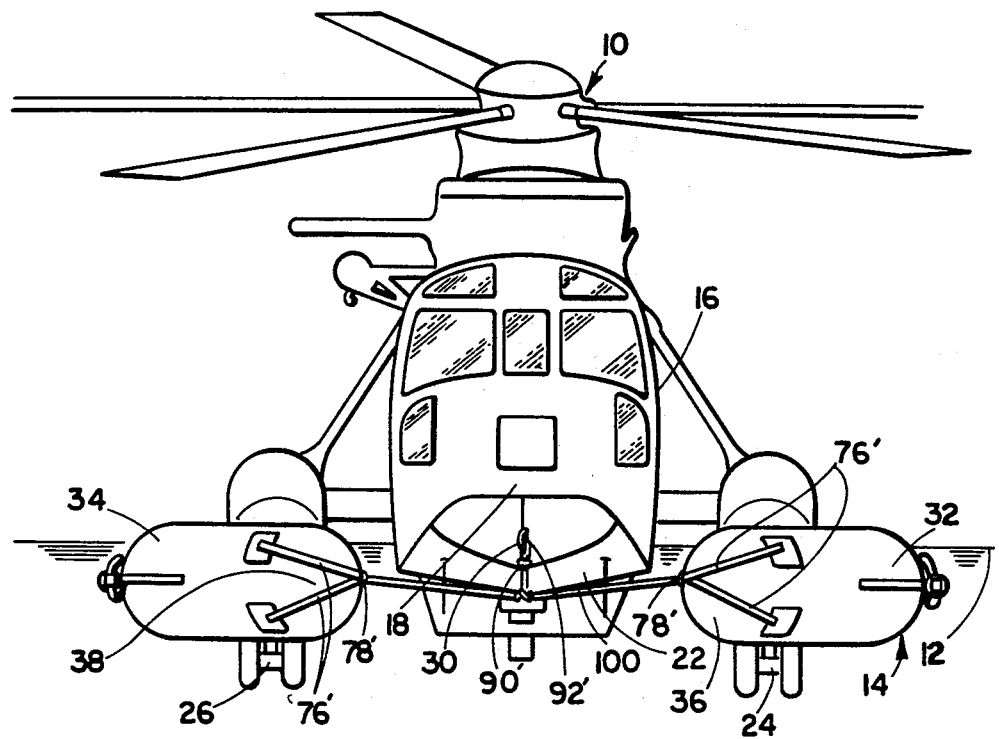
FIG. 2 is a front elevation of the helicopter and flotation system shown in FIG. 1.
Figure 3:
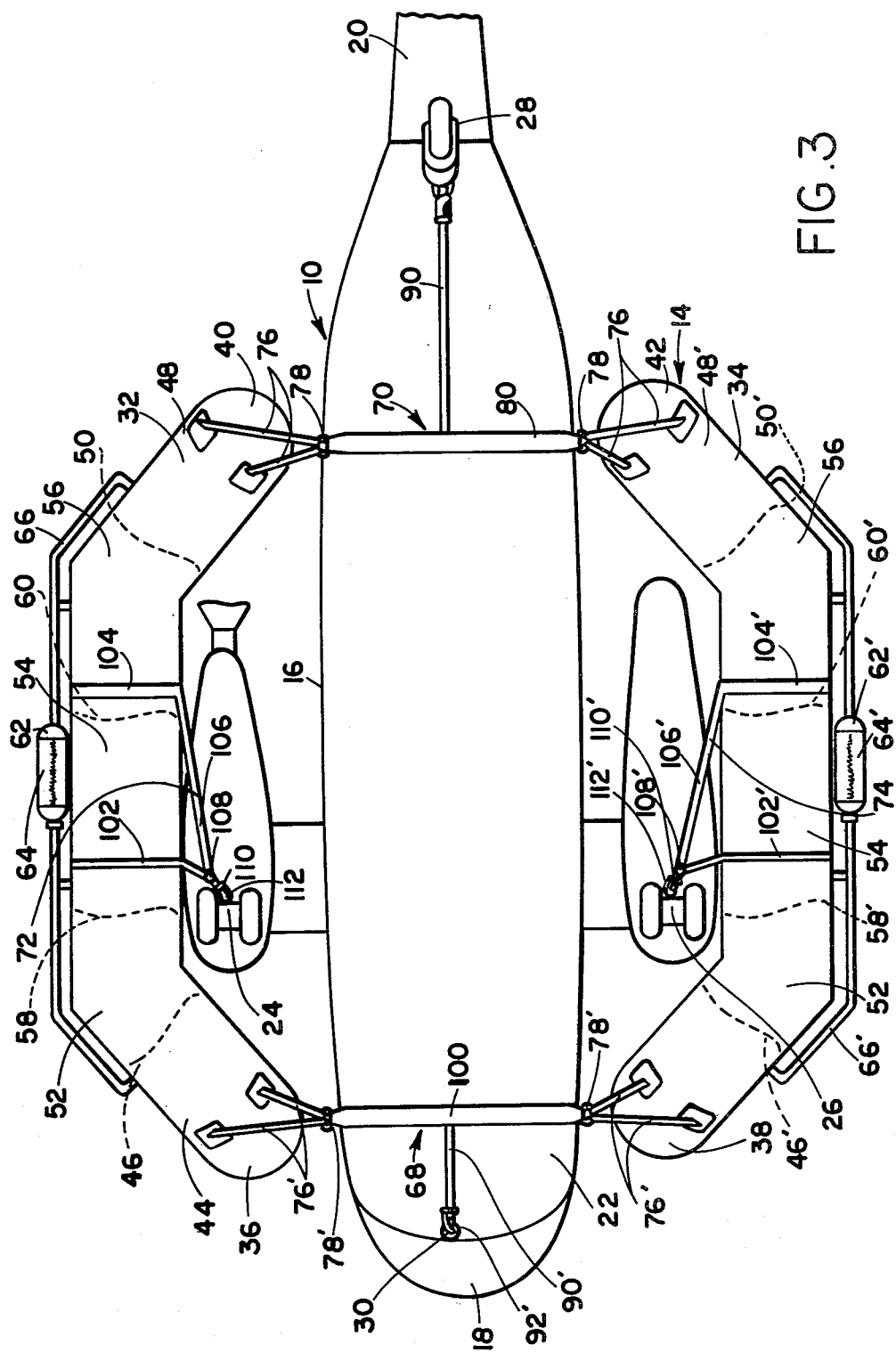
FIG. 3 is a bottom view of the helicopter and flotation system shown in FIGS. 1 and 2.

Referring to FIGS. 1, 2 and 3, an aircraft such as a helicopter 10 is shown downed on water 12 and supported by flotation system 14 embodying this invention.

The helicopter 10 has a fuselage 16 with a first end portion such as nose portion 18 and a second end portion such as tail portion 20. An intermediate portion includes a hull 22 extending from the nose portion 18 to the tail portion 20. At each side of the hull 22 are main landing gears 24 and 26 at the port and starboard sides, respectively. A tail wheel 28 is provided at the stern of the hull 22 and a nose tiedown ring 30 is provided at the nose portion 18.

Figure 4:
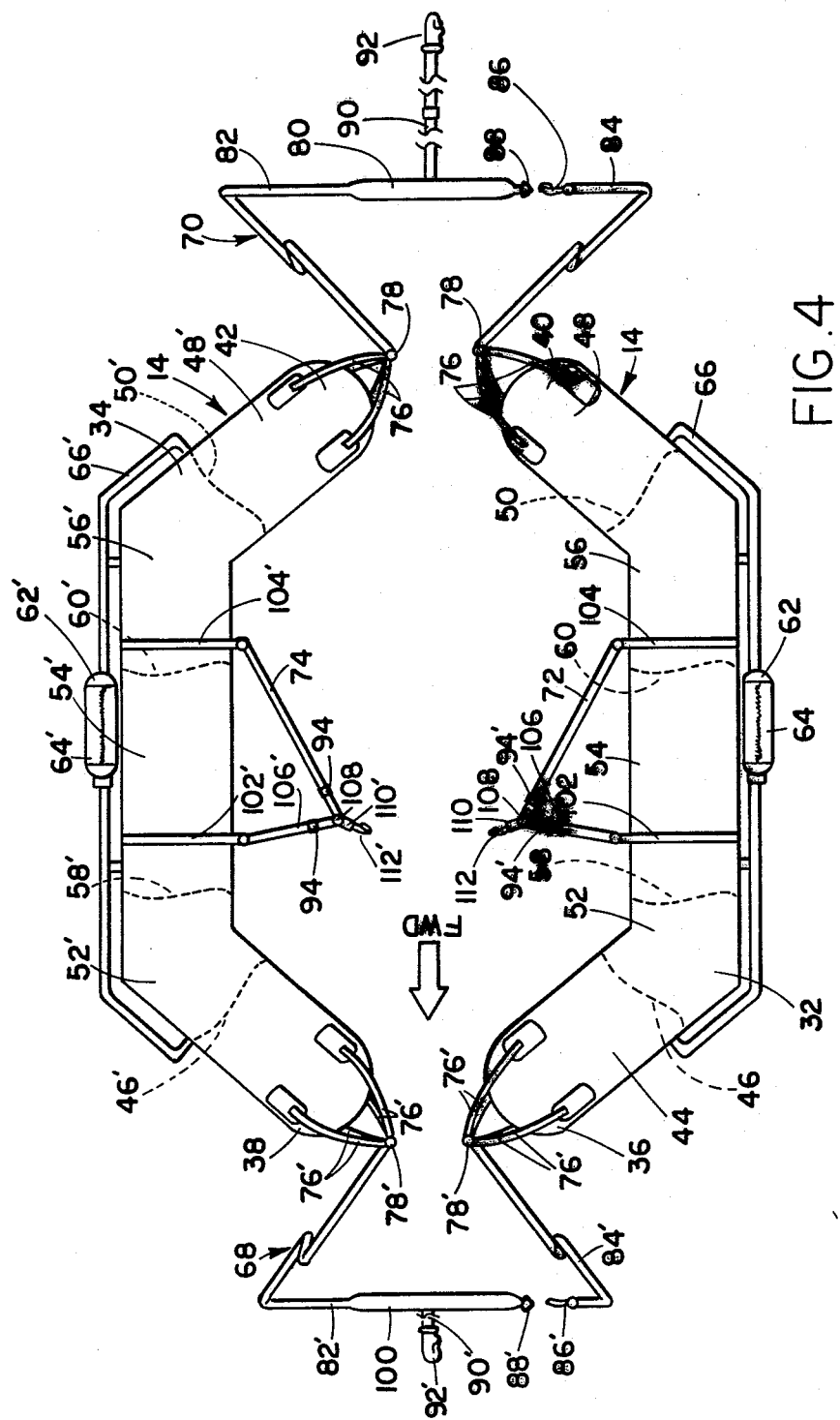
FIG. 4 is a plan view of the flotation collars and supporting means for the flotation system shown in FIGS. 1, 2 and 3.

Referring to FIG. 4, a plan view of the flotation system 14 is shown without the helicopter 10 including a first inflatable collar such as left or port collar 32 and a second inflatable collar such as right or starboard collar 34. The port collar 32 has one end such as forward end 36 for positioning at the nose portion 18 of the fuselage 16. A corresponding end such as forward end 38 of the starboard collar 34 is also provided for positioning at the nose portion 18. The port collar 32 has another end such as aft end 40 for positioning at the aft end of the hull 22. A corresponding aft end 42 is provided on the starboard collar 34.

The port collar 32 and starboard collar 34 are made of a flexible, high-strength fabric coated with a gas impervious material and, in this embodiment, the fabric is of 0.016 inch gauge nylon fabric coated with polyurethane. Each of the collars 32 and 34 are divided into separate chambers and, specifically, the port collar 32 has an end chamber such as forward chamber 44 separated from other chambers by a bulkhead 46. The port collar 32 also has a second end chamber such as aft chamber 48 separated from the other chambers by a bulkhead 50. Intermediate chambers 52, 54 and 56 in the port collar 32 are provided between the forward chamber 44 and aft chamber 48. Bulkheads 58 and 60 separate intermediate chamber 54 from intermediate chamber 52 and from intermediate chamber 56, respectively. Inflation bottle 62 is held in a bottle pouch 64 and connected to the chambers 44, 48, 52, 54 and 56 by an inflating gas line 66 in communication with the forward chamber 44, aft chamber 48 and intermediate chambers 52, 54 and 56 by check valves for inflating the port collar 32 and maintaining the inflation of the individual chambers even if one of the chambers may be punctured.

In the embodiment shown, the inflation bottle 62 contains nitrogen at a gauge pressure of 3100 psi or less so that upon inflation of the port collar 32, the pressure within the collar will be about 3 psi gauge. Relief valves are provided which are set at 3 psig plus or minus 0.5 psig. The volume of the port collar 32 is about 173 cubic feet and has a buoyancy of about 10,766 pounds. The collar may be inflated in about one minute at normal temperatures. Inflation is provided by pulling a lanyard (not shown) connected to the inflation bottle 62. The construction of the starboard collar 34 is the same as the construction of the port collar 32 and the corresponding bulkheads and chambers as well as the inflation bottle, bottle pouch and gas line are designated by the same numbers with the addition of the prime mark.

Figure 5:
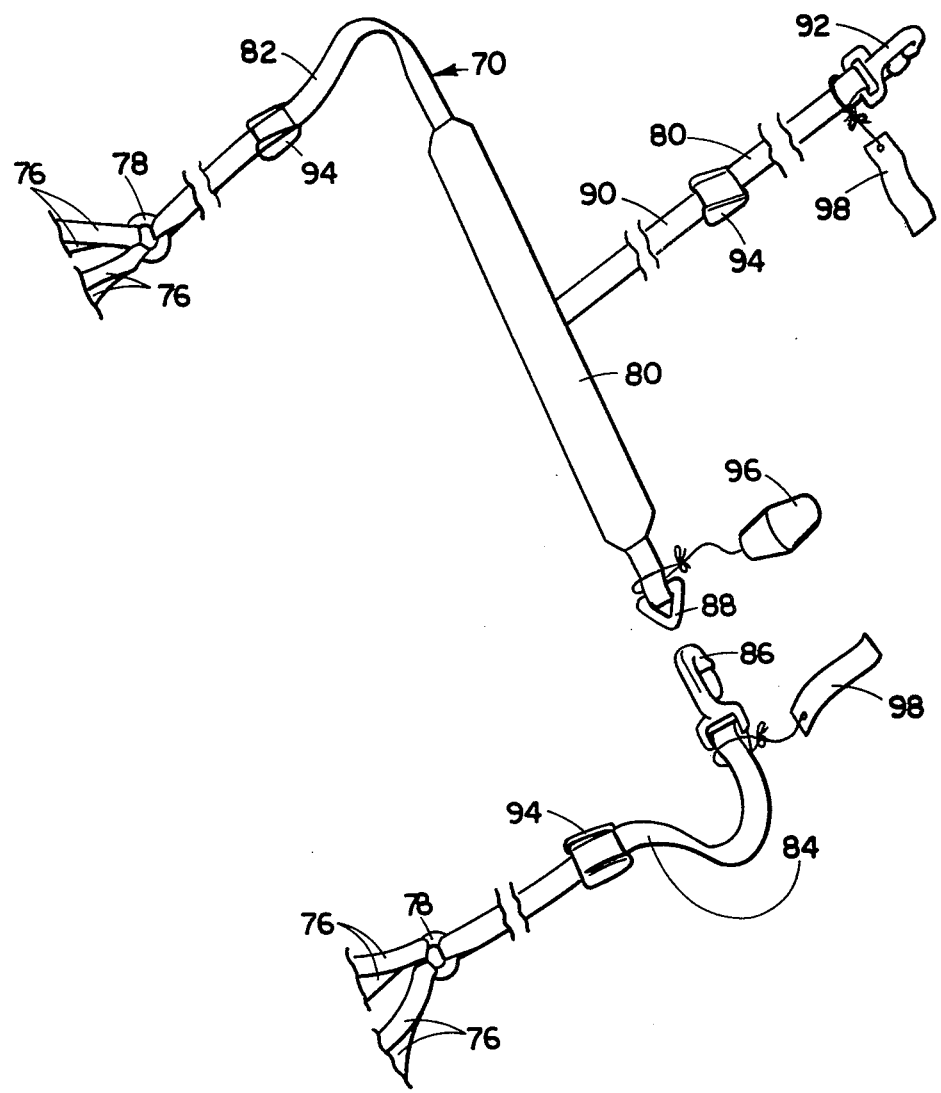
FIG. 5 is an enlarged fragmentary view showing the belly band and positioning strap at the aft end of the flotation system assembly.

Referring again to FIG. 4, the supporting means for connecting the port collar 32 and starboard collar 34 to the fuselage 16 of the helicopter 10 includes a forward belly band assembly 68, an aft belly band assembly 70, and intermediate yoke assemblies 72 and 74. The forward belly band assembly 68 and the aft belly band assembly 70 are of similar construction and therefore the following description of the aft belly band assembly also applies to the construction of the forward belly band assembly. Attached to the aft end 40 of the port collar 32 and the aft end 42 of the starboard collar 34 are a plurality of collar straps 76 fastened to the wall of the collar at circumferentially spaced positions around the collar and connected to rings 78. As shown more clearly in FIG. 5, an aft belly band 80 is connected to the ring 78 of the starboard collar 34 by a starboard strap 82. The ring 78 on the port collar 32 is connected to the aft belly band 80 by a port strap 84 which may have a snap hook 86 for attachment to a D-ring 88 connected to one end of the belly band. An aft positioning strap 90 is fastened to a center portion of the belly band 80 and has a snap hook 92 for attachment to a ring on the tail wheel 28. Adjusting buckles 94 on the starboard strap 82, port strap 84 and aft positioning strap 90 are provided for adjusting the length of these straps. Also a float 96 colored for visibility with a color such as bright orange may be attached to the D-ring 88 on the end of the aft belly band 80 and bright colored tags 98 may be attached to the snap hook 86 at the end of the port strap 84 and to the snap hook 92 at the end of the positioning strap 90. As indicated, the forward belly band assembly 68 has the same construction as the aft belly band assembly 70 and the straps and other parts of the assembly fastened to a forward belly band 100 have been designated with the same numbers with the addition of the prime mark.

The intermediate yoke assembly 72 which is mounted on the port collar 32 has a pair of spaced-apart circumferentially extending intermediate collar straps 102 and 104 connected by a yoke 106 to a ring 108. A strap 110 is connected to the ring 108 and has a snap hook 112 for attaching to a ring on the landing gear 24. The intermediate yoke assembly 74 attached to the starboard collar 34 has a similar construction and the parts of that assembly are numbered the same as the intermediate yoke assembly 72 for the port collar 32 with the addition of the prime marks.

In operation, the port collar 32 and straps 84 and 84' of the forward belly band assembly 68 and aft belly band assembly 70 as well as the intermediate yoke assembly 72, the inflation bottle 62 and bottle pouch 64 connected to the gas line 66 is packed in a container (not shown) and identified as the port collar by an appropriate color such as red. The starboard collar 34 and the forward belly band assembly 68 and aft belly band assembly 70 attached to the starboard collar along with the intermediate yoke assembly 74 and a bottle pouch 64' and bottle 62' connected to the gas line 66' is likewise packed in a container and identified as the starbord collar by an appropriate collor such as green. The port collar 32 and starboard collar 34 are loaded in their separate containers aboard the rescue helicopter or boat. The collars 32 and 34 are then lifted out of their containers and when the downed helicopter is reached each collar is lowered with a swimmer into the water. A third swimmer may also be lowered into the water. The first and second swimmers each push their collar bundle to the designated side of the downed helicopter, red bundle for the port collar 32 to the port side and green bundle for the starboard collar to the starboard side. The bundles are packed so that the snap hooks 112 and 112' are exposed and may be made visible with a bright orange flag attached to the snap hooks. The swimmers grasp the snap hooks 112 and 112' and snap the hooks to rings on the port landing gear 24 and starboard landing gear 26. The swimmers then return to the bundles and grasp the bright orange flag exposed at the forward end of each bundle. On the starboard side the flag is attached to the snap hook 92' on the forward positioning strap 90' and this hook is attached to the nose tiedown ring 30. The snap hook 86' on the port strap 84 of the port bundle is attahed to the D-ring 88' on the end of the forward belly band 100 marked by a bright colored buoy 96'.

After returning to the appropriate bundle, the swimmers grasp the bright orange flags 98 and again the swimmer on the starboard side attaches the snap hook 92 to the ring on the tail wheel 28. The swimmer on the port side attaches the snap ring 86 to the D-ring 88 of the aft belly band 80. The swimmers then swim forward, arm the inflation bottles 62 and 62' and grasp the firing lanyards. Then upon signal each swimmer pulls sharply to simultaneously fire the inflation valve on each of the inflation bottles 62 and 62'. After approximately sixty seconds the collars 32 and 34 inflate to shape. The straps then may be adjusted at the buckles 94 until the collars are pulled into position. The pressure of each of the ten chambers may be topped off individually through rotatable fittings located on the outboard side of each collar.

In the event the helicopter is inverted it may not be possible to reach the ring at the tail wheel 28 or the nose tiedown ring 30. In that event attachment to the main landing gears 24 and 26 only will provide a considerable amount of buoying and stabilizing force.

While a certain representative embodiment and details have been shown for the purpose of illustrating the invention, it will be apparent to those skilled in the art that various changes and modifications may be made therein without departing from the spirit or scope of the invention.

I claim:

1. An auxiliary flotation system for aircraft downed at sea comprising a first inflatable collar for positioning on the left side of the aircraft, a second inflatable collar for positioning on the right side of the aircraft, supporting means for connecting said first inflatable collar and said second inflatable collar to the aircraft, said supporting means including strap means extending directly between one end of said first inflatable collar and a corresponding end of said second inflatable collar, positioning means fastened to said strap means and having means for connection to, and beneath, a first end portion of the aircraft for holding said strap means in a position for supporting a predetermined part of the aircraft upon inflation of said first inflatable collar and said second inflatable collar, and means for inflating said first inflatable collar and said second inflatable collar after said positioning means is attached to the aircraft, said supporting means further including a second strap means extending between the other end of said first inflatable collar and a corresponding end of said second inflatable collar, a second positioning means fastened to said second strap means and having means for connecting said positioning means to, and beneath, a second end portion of the aircraft for locating said second strap means in a position for supporting a second predetermined part of the aircraft upon inflation of said first inflatable collar and said second inflatable collar, said supporting means also including a third and fourth strap means connected to said first inflatable collar and said second inflatable collar, respectively, at positions intermediate the ends of said first inflatable collar and said second inflatable collar for supporting an intermediate part of the aircraft, said third and four strap means being attached to, and beneath, the aircraft at a position intermediate said position for supporting a first predetermined part of the aircraft and said position for supporting a second predetermined part of the aircraft.

2. The auxiliary flotation system according to claim 1 wherein said strap means is separable into a single strap connected to said first inflatable collar, a belly band engageable with the aircraft at said predetermined part connected to said second inflatable collar and to said positioning means, said second strap means being separable into a single strap connected to said first inflatable collar and a second belly band engageable with the aircraft at said second predetermined part connected to said second inflatable collar and to said second positioning means.

3. The auxiliary flotation system according to claim 1 wherein said first inflatable collar and second inflatable collar are divided into separate chambers with an end chamber at said one end of said first inflatable collar and an end chamber at said corresponding end of said second inflatable collar for supporting said predetermined part of the aircraft.

4. The auxiliary flotation system according to claim 3 wherein said first inflatable collar and said second inflatable collar have second end chambers at the other ends of said first inflatable collar and said second inflatable collar for supporting said second predetermined part of the aircraft.

5. The auxiliary flotation system according to claim 4 wherein said first inflatable collar and said second inflatable collar have intermediate chambers between said first end chambers and said second end chambers, said supporting means including a third and fourth strap means connected to said first inflatable collar and said second inflatable collar, respectively, at positions intermediate the ends of said first inflatable collar and said second inflatable collar for supporting an intermediate part of the aircraft, said third and fourth strap means being attached at positions intermediate said end positions for supporting a first predetermined part of the aircraft and said end positions for supporting a second predetermined part of the aircraft so that said intermediate chambers support said intermediate part of the aircraft.

* * * * *